United States Patent [19]

Ryder et al.

[11] Patent Number: 4,757,429
[45] Date of Patent: Jul. 12, 1988

[54] ADJUSTMENT BRACKET ASSEMBLY

[75] Inventors: Francis E. Ryder; Stephen P. Lisak, both of Arab, Ala.

[73] Assignees: Ryder International Corporation, Arab, Ala.; Textron Inc., Providence, R.I. ; a part interest

[21] Appl. No.: 28,605

[22] Filed: Mar. 20, 1987

[51] Int. Cl.$^4$ .............................................. B60Q 1/08
[52] U.S. Cl. ........................................ 362/69; 362/272
[58] Field of Search ...................... 362/66, 69, 80, 269, 362/272, 275, 368, 428, 418

[56] References Cited

U.S. PATENT DOCUMENTS

| 1,697,242 | 1/1929 | Hill | 362/66 |
| 4,237,529 | 12/1980 | Mutschler et al. | 362/66 |
| 4,574,334 | 3/1986 | Igura | 362/66 |
| 4,665,469 | 5/1987 | Furfari et al. | 362/66 |

FOREIGN PATENT DOCUMENTS

| 2249694 | 4/1974 | Fed. Rep. of Germany | 362/66 |
| 3445703 | 6/1985 | Fed. Rep. of Germany | 362/66 |
| 0195441 | 11/1984 | Japan | 362/66 |
| 2089958 | 6/1982 | United Kingdom | 362/66 |
| 2109082 | 5/1983 | United Kingdom | 362/66 |

Primary Examiner—Charles J. Myhre
Assistant Examiner—David A. Okonsky
Attorney, Agent, or Firm—Trexler, Bushnell, Giangiorgi & Blackstone, Ltd.

[57] ABSTRACT

An adjustment bracket assembly is provided for attachment between an automotive vehicle frame member or the like and a headlamp housing or the like to permit pivotal motion of the headlamp housing relative to the frame member and about generally vertical and horizontal axes so as to achieve corresponding vertical and horizontal aiming of an associated headlamp beam. The adjustment bracket assembly comprises a one-piece integrally formed vertically elongate housing and support member defining generally vertically oriented, elongate guide bores for receiving and supporting an elongate drive shaft member with a free end thereof projecting outwardly of the housing and support member for engagement with a driver for operatively engaging the same with the headlamp housing for selectively causing pivotal movement thereof about one of generally vertical and horizontal axes to achieve one of vertical and horizontal aiming of the associated headlamp beam. The housing and support member further defines a gear box compartment integrally formed therewith for mounting gears to be operatively engaged with the drive shaft and also operatively engaged with the headlamp housing to achieve one of vertical and horizontal pivotal motion thereof in response to rotation of the drive shaft. The housing and support member further includes integrally formed mountings for mounting the same in a secure, non-movable fashion to the automotive vehicle frame member or the like.

8 Claims, 4 Drawing Sheets

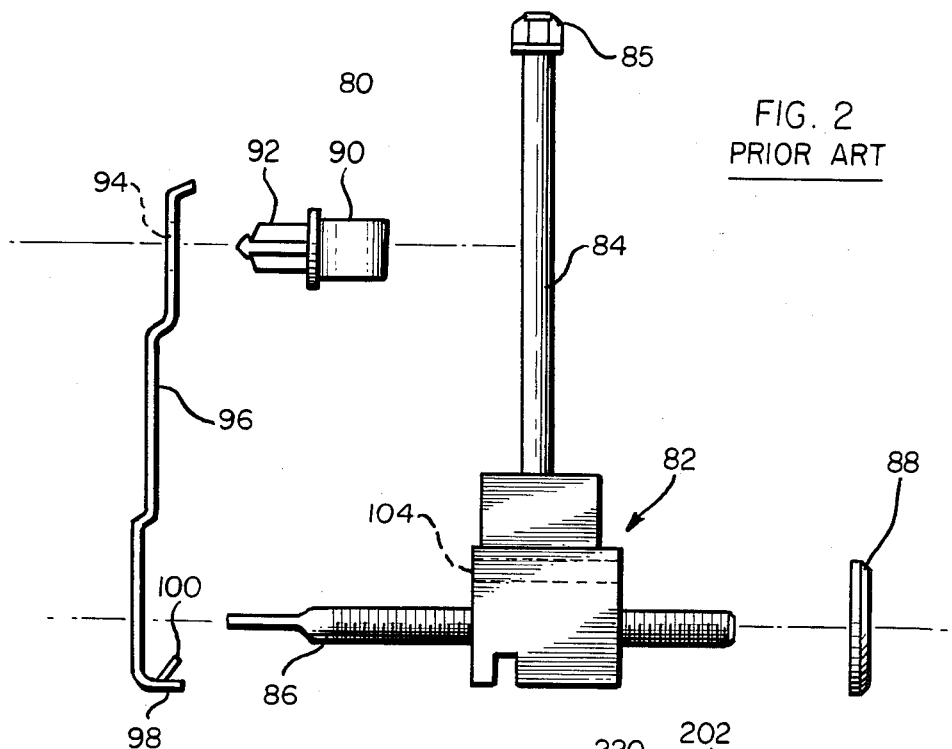
FIG. 2 PRIOR ART
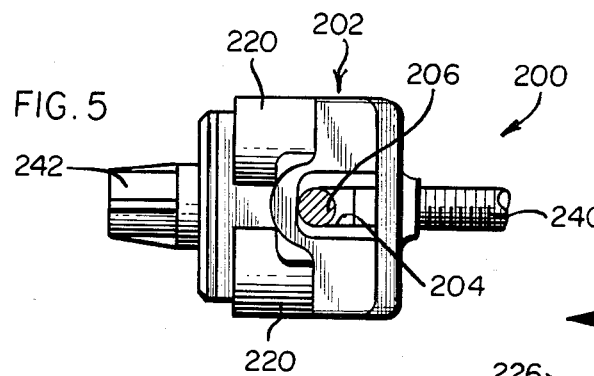
FIG. 5
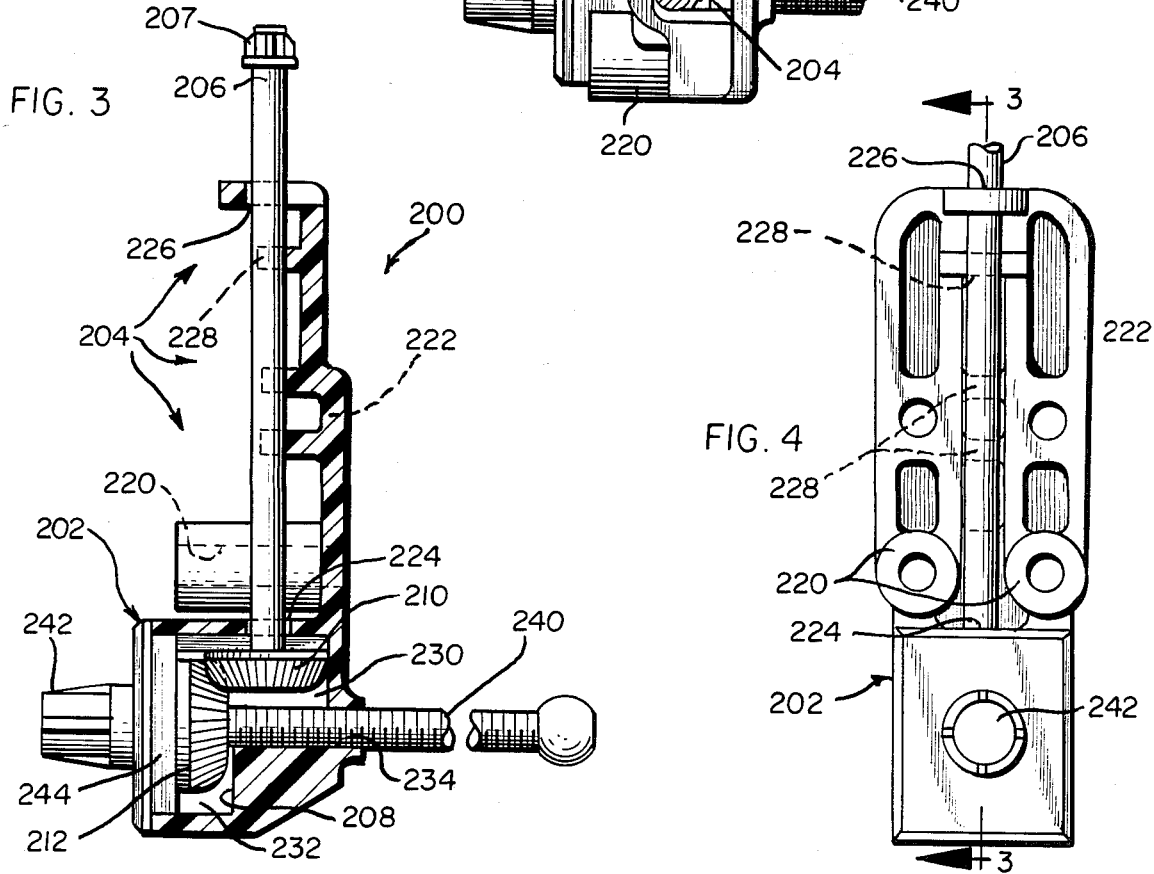
FIG. 3
FIG. 4

ADJUSTMENT BRACKET ASSEMBLY

BACKGROUND OF THE INVENTION

This invention relates generally to the automotive arts, and more particularly to adjustable automotive headlamp assemblies. Still more particularly, the invention relates to a novel and improved adjustment bracket assembly for facilitating the proper horizontal and vertical aiming of a headlamp beam upon installation of a headlamp assembly to an automotive vehicle.

A number of headlamp adjusting and aiming systems have been proposed for automotive vehicles. For example, the more traditional separately mounted sealed beam type of headlamps require independent adjustment utilizing adjusting screws or the like, which often require the partial removal of body or bezel components for access, to achieve the desired adjustment. These adjusting screws and cooperating mounting brackets and the like are often of metallic material, such that they may become corroded and rusted, or befouled with road grime and the like over a long period of service, rendering the desired adjustment difficult or impossible when new headlamps are installed. In contrast, headlamp assemblies are now being proposed which utilize unitary housing and sealed beam headlamp assemblies designed to fit aerodynamically styled automotive body contours. In order to accommodate aiming of these more modern, unitary type headlamp assemblies, various automated or semi-automated adjusting mechanisms have been heretofore proposed.

For example, our prior U.S. application Ser. No. 794,092, filed Oct. 31, 1985, and now abandoned proposes a gear box type of assembly for achieving pivotal horizontal and vertical motion of such a headlamp assembly to achieve the desired adjustment and aiming of the associated headlamp beam. A further system has been proposed in U.S. Pat. No. Re. 32,088. This arrangement utilizes a system of snap-in ball joint type of assemblies for mounting the headlamp to a frame member for pivotal motion about generally vertical and horizontal axes, and for also accommodating one or more advanceable and retractable drive shaft members or assemblies for achieving the desired adjustments. However, with development of a number of different vehicle bodies and assemblies requiring different headlamp shapes and styles, a number of different adjustment mechanisms have been developed and modified over successive models and years, such that it is difficult or impossible to propose but a single assembly for use in all such vehicles, without substantial redesign of the vehicle.

In any event, the provision of an adjustable mounting for headlamp assemblies requires at a minimum that the headlamp be mounted at three points for generally vertical and horizontal pivotal motion. At one of these points, a suitable advanceable and retractable drive shaft means or member is provided for tilting or pivoting the headlamp about a generally vertical axis, while at another of these mounting points a similar drive shaft means or assembly is provided for pivoting the assembly about a generally horizontal axis.

In one such prior art construction, as will be more fully described hereinbelow, a generally vertically extending enlarged mounting bracket is provided which is coupled with the headlamp assembly generally in alignment with a central vertical axis thereof. This so-called vertical bracket assembly generally includes a pair of ball joint connecting members for attachment with generally upper and lower spaced portions along the vertical central axis of the headlamp. One of these ball-type connectors is further mounted to an extendable and retractable adjustment shaft member for achieving the desired vertical tilting of the headlamp assembly, that is, tilting thereof about a generally horizontal axis.

A similiar, so-called horizontal bracket assembly generally includes a ball joint connecting member or attachment with a point on the headlamp assembly to one side of the vertical central axis, and preferably at an outer, lower corner thereof. The ball joint type connector is also mounted to an extendable and retractable adjustment shaft for achieving the desired horizontal tilting of the headlamp, that is tilting thereof about a generally vertical axis.

However, in the prior art device, the vertical and horizontal bracket assemblies have become quite complex, requiring that a number of components be assembled on the vehicle assembly line to accommodate the desired adjusting functions of the assemblies. For example, a separately fabricated gear box must be attached to a generally vertical support bracket member to accommodate a gear arrangement for the advancing and retracting of the adjustment shaft member. Additionally one or more shaft retaining clips and/or brackets must also be separately provided for mounting a generally vertically extending drive shaft to the vertical bracket member. This drive shaft extends into the gear box for driving the gears in the desired fashion to achieve the desired advancing and retracting of the adjustment shaft. Moreover, in order to achieve the desired rigid and secure mounting of the bracket member to the desired portion or member of the vehicle frame, additional mounting clips, brackets and the like are often required.

Accordingly, the prior art vertical and horizontal bracket assemblies require a number of separately provided parts which were to be assembled in the proper fashion and in good working order to secure an operative assembly, for further assembly with the vehicle. In modern, high volume, high speed automotive assembly lines, it is desirable to minimize the number of separate assembly steps and separate parts which must be assembled, in order to optimize the assembly operation. Accordingly, the provision of a large number of relatively small parts requiring some accuracy and precision in their assembly is to be avoided, in order to optimize the assembly procedure and minimize the cost thereof and the resultant cost of the finished automotive vehicle.

Advantageously, we have proposed novel and improved vertical and horizontal adjustment bracket assemblies which utilize a minimum number of parts, which parts may be relatively simply and easily pre-assembled prior to the automotive assembly procedure, such that the pre-assembled unit may be relatively quickly and easily attached to the desired position on the automotive vehicle frame or the like. Accordingly, our invention advantageously minimizes and greatly simplifies the pre-assembly and final assembly of the adjustable headlamp arrangement.

Briefly, in accordance with the invention, an adjustment bracket assembly is provided for attachment between an automotive vehicle frame member or the like and a headlamp housing or the like to permit pivotal motion of the headlamp housing relative to the frame member and about generally vertical and horizontal axes so as to achieve corresponding vertical and horizontal aiming of an associated headlamp beam. The adjustment bracket assembly comprises a one-piece integrally formed vertically elongate housing and support member defining generally vertically oriented, elongate guide bore means for receiving and supporting an elongate drive shaft member with a free end thereof projecting outwardly of said housing and support member for engagement with drive means for operatively engaging the same with said headlamp housing for selectively causing pivotal movement thereof about one of generally vertical and horizontal axes to achieve one of said vertical and horizontal aiming of the associated headlamp beam; said housing and support member further defining a gear box compartment integrally formed therewith for mounting gear means to be operatively engaged with said drive shaft and also operatively engaged with said headlamp housing to achieve said one of said vertical and horizontal pivotal motion thereof in response to rotation of said drive shaft; and said housing and support member further including integrally formed mounting means for mounting the same in a secure, non-movable fashion to said automotive vehicle frame member or the like.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 2 is an exploded side elevation of one prior art construction of an adjustment bracket assembly;

FIG. 3 is a side elevation of an adjustment bracket assembly in accordance with one form of the invention which may be advantageously substituted for the prior art assembly of FIG. 2;

FIG. 4 is a rear elevation, partially broken away, of the assembly of FIG. 3;

FIG. 5 is a top plan view, partially in section and partially broken away, of the assembly of FIG. 3;

DETAILED DESCRIPTION OF THE ILLUSTRATED EMBODIMENT

Figure 1:
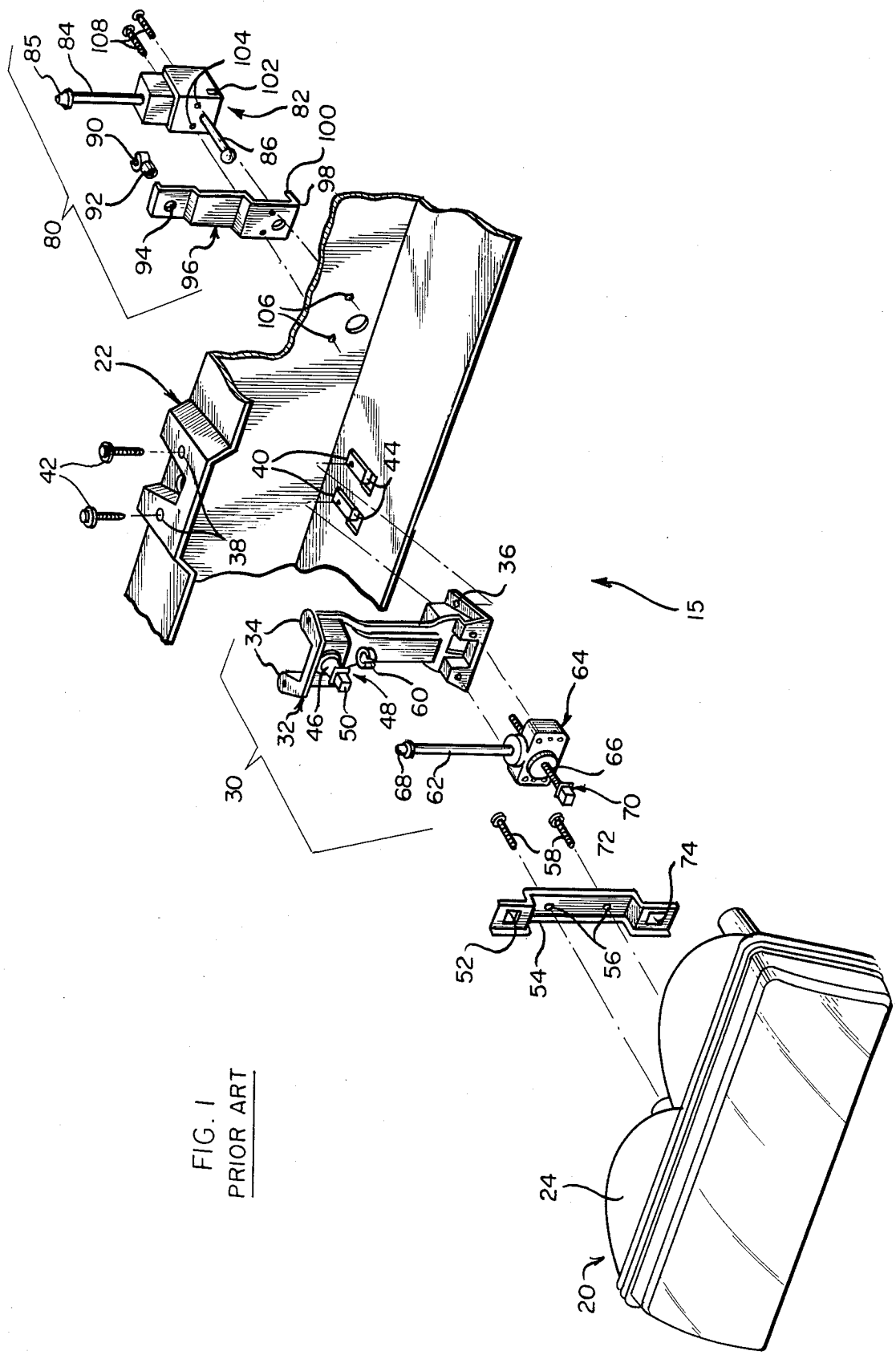
FIG. 1 is an exploded perspective view of a headlamp assembly, including mounting and adjustment bracket assemblies in accordance with the prior art, the present invention being an advantageous substitute for these prior art components.

Referring now to the drawings and initially to FIG. 1, there is shown an adjustable headlamp mounting arrangement or assembly 15 utilizing components in accordance with the prior art. This assembly 15 includes means for adjustably mounting a headlamp assembly 20 relative to an automotive vehicle frame portion 22. The mounting and adjustment assembly utilized are such as to mount the headlamp assembly 20 for both vertical and horizontal adjustments relative to the frame 22, for accomplishing aiming of the headlamp beam. That is, the headlamp assembly 20 generally comprises a housing 24 which is mounted to the frame portion 22 for a generally pivotal movement about a generally central vertical axis thereof and about a generally central horizontal axis thereof, to achieve corresponding up-down and side-to-side pivotal adjustment of the headlamp for corresponding aiming of the headlamp beam.

As illustrated in FIG. 1, one frequently used prior art construction comprises a relatively cumbersome arrangement requiring the assembly of a number of parts and sub-assemblies, to accomplish the desired adjustable mounting, as well as to accommodate components for accomplishing the desired amount of adjustment. In this regard, the prior art contemplates use of a first or vertical adjustment bracket assembly designated generally by reference numeral 30. Assembly 30 is mounted to a vertically central location at the rear of headlamp housing 24 for permitting pivotal motion thereof in both the horizontal and vertical planes. Assembly 30 further provides a drive means or structure 64 for accomplishing adjustment in an up-down or vertical orientation, that is, about a generally horizontal axis.

This vertical bracket assembly 30 includes an elongate vertical bracket member 32, preferably comprising a molded body of a suitable plastic material. This bracket 32 includes upper and lower mounting bores or apertures 34, 36 disposed for alignment with similiar through apertures 38, 40 in the frame 22. Elongate threaded fasteners 42 are inserted in the through openings 38, and may be of the self-threading variety for threading into corresponding bores 34 in bracket 32. However, the through apertures 40 are preferably provided with self-engaging nut-type fasteners of the type known as Tinnerman nuts which provide integrally threaded or thread-like through apertures 40 aligned with bores 36 for receiving similiar elongate threaded fasteners (not shown) therethrough.

A vertically upper portion of bracket 32 mounts a forwardly projecting post 46 which terminates in a ball joint type connector assembly 48. A ball joint (not shown) engages with a generally rectangular socket 50 which is in turn engageable with a complementary rectangular aperture 52 in a further metallic mounting bracket or strap 54, preferably in a snap-lock type of engagement or a press fit. This latter metallic strap 54 also forms part of the vertical bracket assembly and is arranged for coupling with a rear surface of housing 24. Preferably this joining is done by aligning through apertures 56 of bracket 54 with suitable bores or the like in embossments (not show) at a rear surface of housing 24, and joining the same with complementary threaded fasteners 58.

Spaced somewhat below ball joint 48, a generally C-shaped resilient clip member 60 is assembled with bracket 32. This C-shaped clip 60 receives and guides an upper portion of a first or drive shaft member 62 which forms a portion of a gear box type of drive means or assembly 64. The gear box assembly 64 also has a generally horizontally extending adjustment shaft member 66 which is oriented transversely to the generally vertically oriented drive shaft 62. An upper end of drive shaft 62 is provided with a coupling member or means 68 for receiving a mating tool or mating end of a motorized drive means for rotating the same. The gear box 64 rotatably journals a pair of orthogonally disposed crown or beveled gears (not shown) for transmitting motion from drive shaft 62 to adjustment shaft 66. Preferably, adjustment shaft 66 is threaded so as to advance and retract in a generally horizontal plane in response to rotation to drive shaft 62.

A forwardly disposed end of adjustment shaft 66 is provided with a ball joint assembly 70 substantially similiar to ball joint assembly 48 and comprising a ball member (not shown) and mating socket member 72 for engagement with a similiar generally rectangular through aperture 74 of the bracket or strap 54. Accordingly, gear box assembly 64 accomplishes the desired vertical adjusment of the headlamp housing 24. Respective ball joint assemblies 48 and 70 accommodate or permit a sufficient degree of tilting or pivotal motion of the headlamp housing both in generally vertical and generally horizontal planes to accommodate the desired tilting or pivoting thereof for aiming the headlamp beam.

The structure of FIG. 1 also includes a prior art form of so-called horizontal bracket or adjusting assembly designated generally by reference numeral 80. Horizontal bracket assembly 80 (also illustrated in greatly enlarged fashion in FIG. 2) includes a gear box assembly 82 functionally similiar to gear box assembly 64 previously described. That is, gear box 82 mounts a pair of crown or beveled type gears (not shown) which transmit rotational motion from a generally vertically oriented drive shaft 84 to a generally horizontally oriented and preferably threaded adjustment shaft 86. A forward end of adjustment shaft 86 extends forwardly for coupling with a lower corner portion of the headlamp housing 24 to achieve generally horizontal tilting or pivoting motion thereof. That is, pivoting about a generally vertical central axis is effected for achieving corresponding aiming in the horizontal plane, or in side-to-side fashion, of the headlamp beam In order to properly support respective shafts 84, 86 as well as mount the assembly 80 with the frame 22, a number of additional components are provided. An end cap member 88 engages in a snap-lock fashion or a press fit with an end portion of gear box 82 thus providing an end closure as well as supporting a rear or trailing end of adjustment shaft 86. A generally C-shape clip member 90, which it should be noted is substantially identical with clip 60. embraces and supports an upper part of drive shaft 84. This clip member 9 is provided with a generally snap-lock type of projection 92 which engages a complementary through aperture 94 provided therefor in an elongate assembly bracket member or strap 96, preferably of a metallic material.

The bracket or strap 96 includes a projecting bottom support portion 98 which projects outwardly to embrace a lower corner portion of an exterior surface of gear box 82. This projection 98 preferably includes a further struck out or struck up portion 100 for engaging with an aligned notch or recess 102 formed in the exterior surface of gear box 82. Gear box 82 also preferably includes respective aligned through bores 104 for alignment with mounting apertures 106 for coupling or mounting to bracket 22 in the fashion shown in FIG. 1, preferably by means of threaded fasteners 108.

Figure 10:
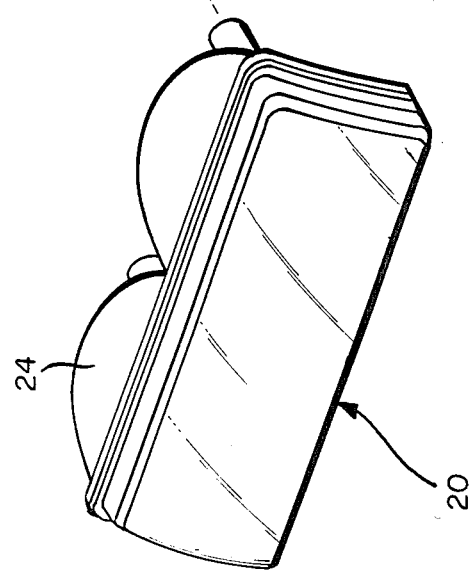
FIG. 10 is an exploded perspective view of a headlamp assembly similiar to FIG. 1 in which the adjustment bracket assemblies in accordance with the invention have advantageously been substituted for those shown in FIG. 1.

Departing from the embodiments illustrated in FIGS. 1 and 2, FIGS. 3 through 5 and FIGS. 6 through 8 illustrate respective alternate forms of vertical and horizontal bracket assemblies, which may be advantageously substituted for those illustrated in FIG. 1, as shown for example in FIG. 10. These respective adjustment bracket assemblies have a number of features in common, whereby attention will first be directed to these common features. Advantageously, both adjustment bracket assemblies 200 and 300, comprise a one-piece integrally molded bracket member or housing and support member 202, 302, which provide in a one-piece integrally formed fashion, a number of the components and parts separately provided and assembled in the embodiment of FIG. 1. This arrangement is particularly advantageous in a relatively high volume, high-speed automotive assembly operation, wherein it is desirable to minimize the number of separate parts which must be individually selected and assembled by the assembly line worker. Moreover, each of the assemblies 200 and 300 can be advantageously provided as illustrated in pre-assembled form, whereby each of the adjustment bracket assemblies only need be assembled with the indicated areas on the automobile frame and with the indicated areas on the headlamp assembly or housing 24 in order to accomplish the completed adjustable mounting of the headlamp assembly relative to the frame. As will be seen presently, the integrally molded form of these adjustment bracket assemblies 200 and 300 also simplify somewhat the mounting of the respective assemblies to the automobile frame 22.

Turning now more particulary to the assemblies 200, 300, each of the housing and support members 202, 302 defines generally vertically oriented, elongate guide bore and/or channel means, here designated generally by reference numerals 204, 304, for receiving and supporting for rotation elongate, generally vertically oriented drive shaft members 206, 306, respectively. These drive shaft members are functionally similar to the drive shaft members 62 and 84 previously described. That is, each drive shaft has a free end projecting outwardly of the housing and support member for engagement with some suitable drive means to thereby operatively interengage the drive means with the headlamp housing for causing the desired pivotal movement thereof about one of generally vertical or generally horizontal axes. Each of these housing and support members 202, 302, further has integrally formed therewithin a gear-box housing or compartment 208, 308, which includes means for rotatably journalling a pair of generally orthogonally disposed and interengaged crown or bevel gear members 210, 212 and 310, 312. Additionally, each of adjustment bracket assemblies 200, 300 includes integrally formed mounting means or portions 220, 222 and 320, 322 for mounting the same in a secure, rigid fashion to the frame member 22.

The shaft-receiving and supporting guide bore means 204, 304 will be seen to further comprise a first generally vertically extending bore portion 224, 324 through a lower part of the respective housing and support members. This bore 224, 324 extends through and is in communication with the gear box compartment 208, 308 for receiving and directing a gear-driving end portion of drive shaft member 206, 306 into engagement with a first bevel or crown gear 210, 310, mounted in the gear box compartment. A second bore portion 226, 326 is substantially vertically spaced from the first bore portion 224, 324 and is coaxially aligned therewith and located on upper part of the housing and support member 202, 302 for receiving and supporting for rotation an upper part of the drive shaft 206, 306. Finally, an elongate, generally semi-cylindrical groove or channel 228, 338 is defined in the housing and support member extending between or intermediate the upper and lower bore portions 224, 326. These latter channel or semi-cylindrical groove members generally define guide means intermediate the first and second bore portions for rotatably supporting the drive shaft member therebetween.

Advantageously, as indicated hereinabove, all of the foregoing components are either integrally formed with the housing and support member 202, 302, or may be readily and simply preassembled therewith, to minimize assembly steps in the final assembly with headlamp housing 20 and frame 22, as illustrated for example in FIG. 10.

Turning now more particularly to the horizontal bracket assembly illustrated in FIGS. 3 through 5, it will be seen that the horizontal adjustment bracket assembly 200 presents two pairs of aligned through bores 220, 222 for alignment with receiving apertures 106 in frame 22, so as to receive suitable fasteners 108 therethrough for coupling the assembly 200 in a rigidly supported fashion to the frame 22, as indicated in FIG. 10. The gear box compartment portion 208 includes a pair of orthogonally disposed gear-receiving and mounting chambers or sub-compartments 230, 232 which are orthogonally disposed and intersect in an area in which the gears 210, 212 mounted therein mesh. An additional elongate groove or channel 234 is also provided for rotatably supporting the elongate adjustment shaft member 240. An external coupling or joining member 242 may engage an outwardly projecting shaft or mounting portion (not shown) of gear 212 to hold the same in place in rotatably journalled condition with respect to a generally vertically disposed supporting surface or platform 244 and its corresponding gear-receiving sub-compartment 232.

The guide channel or groove portion 228 comprises a plurality of resilient, generally C-shaped projections integrally formed with the body 202 and vertically spaced and aligned for partially surroundingly engaging and rotatably supporting the drive shaft member 206. Preferably, mounting bores 220 are relatively enlarged, relatively thick or deep members to provide additional structural rigidity and support in the coupling or connection between the assembly 200 and frame member 22.

Figure 6:
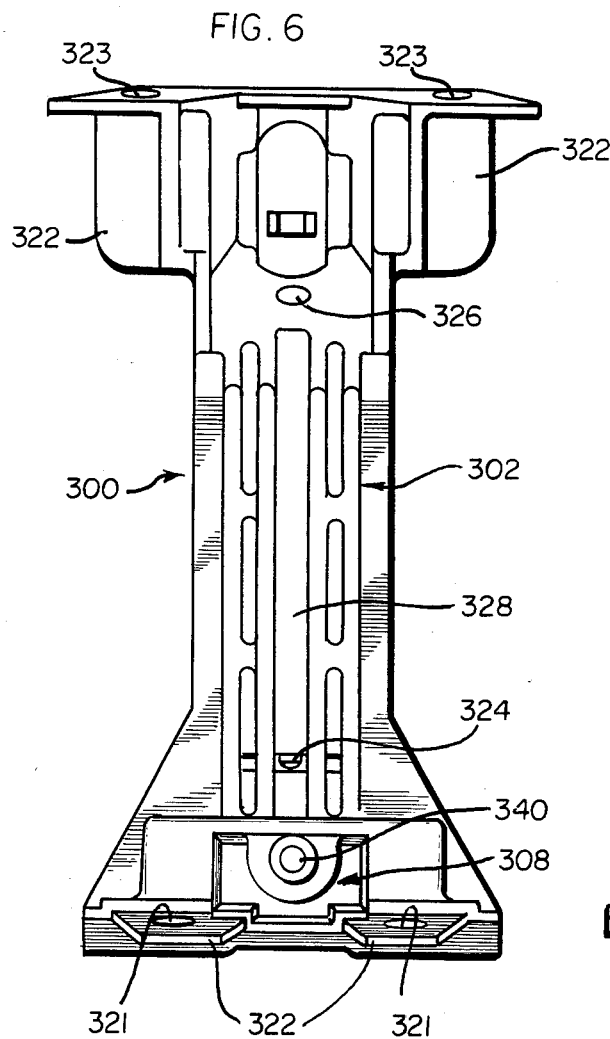
FIG. 6 is a rear elevation of a second form of adjustment bracket assembly in accordance with the invention.
Figure 7:
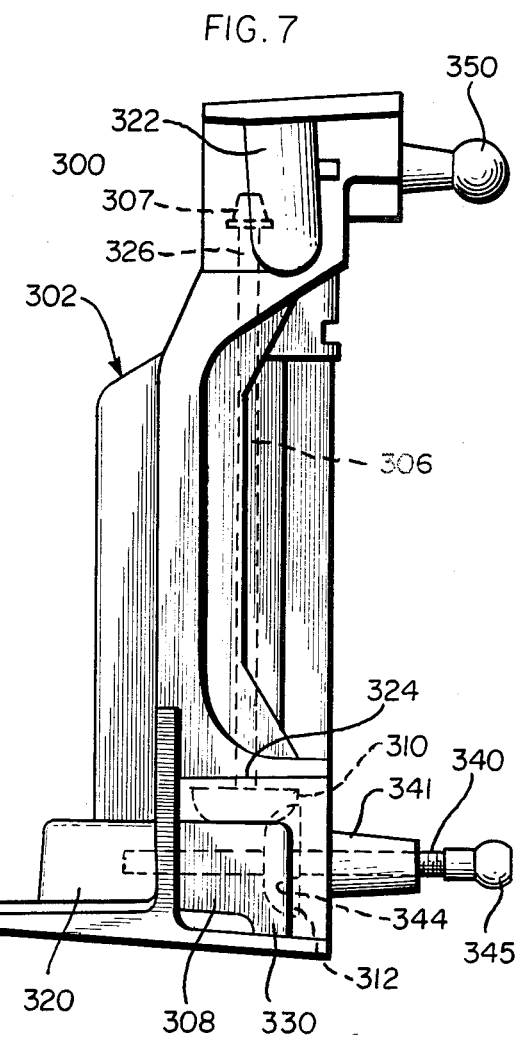
FIG. 7 is a side elevation of the adjustment bracket assembly of FIG. 6.
Figure 8:
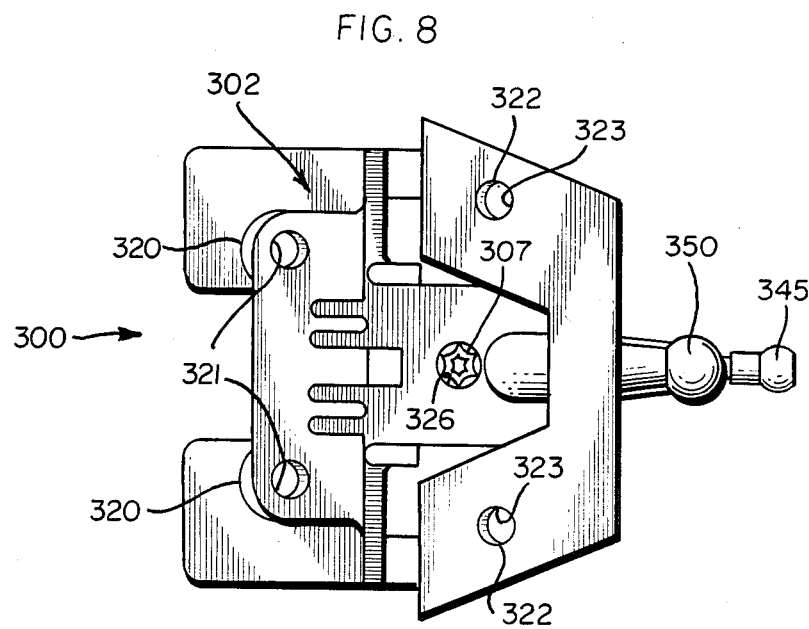
FIG. 8 is a top plan view of the assembly of FIGS. 6 and 7.

Turning now to FIGS. 6 through 8, the second or vertical adjustment bracket assembly will now be described in further detail. In similiar fashion to the horizontal adjustment bracket assembly 200, the vertical adjustment bracket assembly 300 includes in its integrally formed gear box compartment 308 respective gear-receiving sub compartments 330, 332 which are formed in an orthogonal and intersecting fashion. The gear 312 is rotatably journalled and supported at a support wall surface 344 and the adjustment shaft 340 additionally extends outwardly in a generally horizontal orientation through an elongated support sleeve 341. A ball stud portion 345 of a ball joint assembly is also coupled to an outwardly extending end of the shaft 340 for coupling with a suitable mating socket or the like (not shown) attached to or otherwise formed on the headlamp housing 24. However, other coupling arrangements may be utilized without departing from the invention.

In accordance with the further feature of the invention, one member of a universal joint arrangement is integrally formed with the bracket housing and support member. More specifically, in the embodiment illustrated in FIGS. 6 through 8, a ball stud member 350 of a ball joint assembly is utilized. In accordance with the invention this ball stud member 350 is preferably insert molded with an upper portion of the bracket support and housing member 302 so as to project generally horizontally outwardly thereof for engagement with a mating socket operatively coupled with the headlamp housing.

Figure 9:
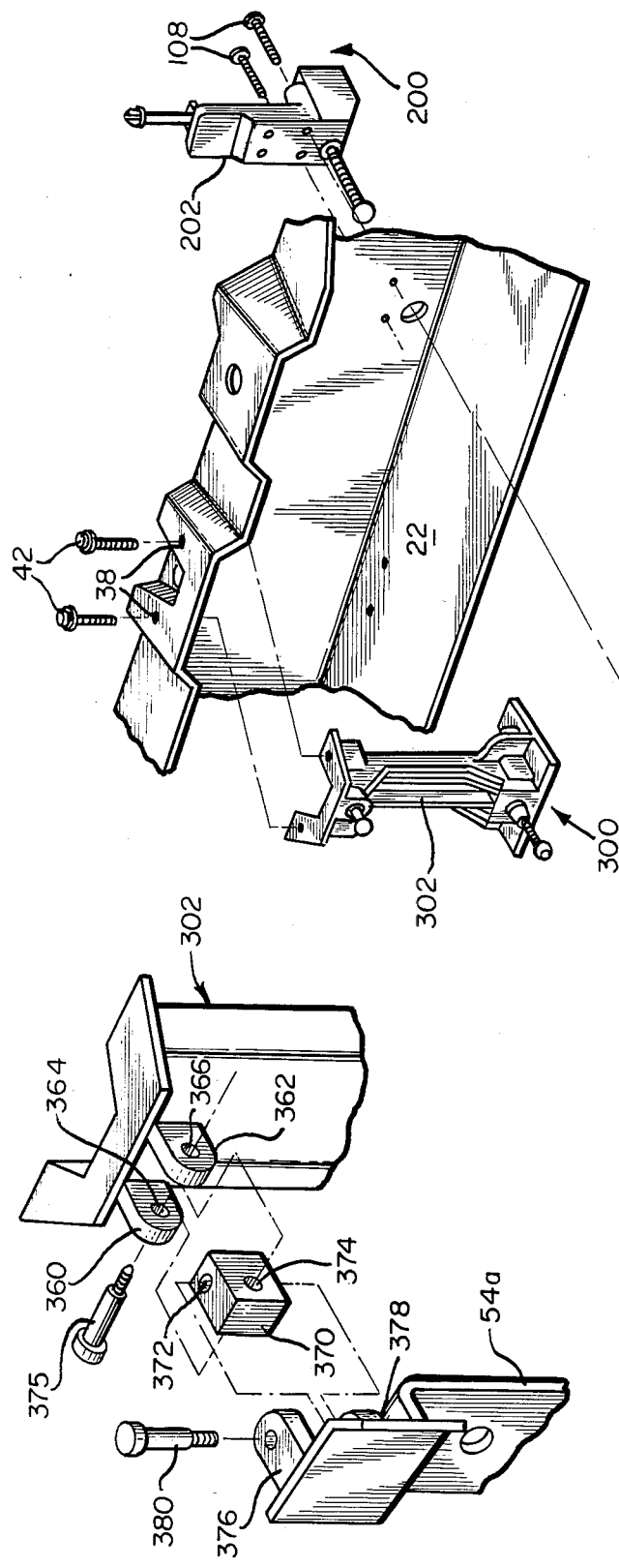
FIG. 9 is a partial perspective view of an alternate form of a portion of the adjustment bracket of the assembly of FIGS. 6 through 8.

Referring now to the alternate embodiment illustrated in FIG. 9, an alternate form of the universal joint arrangement is illustrated. This second universal joint arrangement comprises a generally orthogonally disposed pair of yoke-and-pin or hinge-like connector members. In this regard, one member of the universal joint arrangement is formed integrally with the vertical support member and housing 302, in the form of a pair of parallel, spaced projecting ears 360, 362 having aligned through apertures 364 and 366. While in the illustrated embodiment these apertures 364 and 366 define a generally horizontal axis, it should be noted that the ears and apertures may be so arranged as to define a general vertical axis without departing from the invention.

The universal joint arrangement illustrated in FIG. 9 further includes an intermediate member comprising a body 370 defining a pair of mutually orthogonally oriented through bores 372 and 374. The bore 374 is disposed for alignment with the through apertures 364, 366 so as to receive a through pivot pin 375 for pivotal motion of the intermediate member 370 about the axis defined by the pivot pin and the aligned apertures through which it extends. The through bore 372 of the intermediate member 370 is positionable for alignment with a pair of further parallel spaced, apertured ears 376, 378 which are engaged with the headlamp housing and disposed so as to define a generally vertical axis. It should be noted that the opposite arrangement may be utilized without departing from the invention, that is, wherein the ears 360, 362 are aligned to define the vertical axis of rotation or pivotal motion and the ears 376 and 378 are aligned to define the horizontal axis.

In any event, the latter ears 376 and 378 are aligned with through bore 372 to receive a second pivot pin 380 therethrough so as to permit pivotal motion about the vertical axis thus defined. In the illustrated embodiment, the latter apertured ears 376 and 378 may be formed on a strap or bracket member 54a, substantially similiar to strap 54 illustrated and described above with reference to FIG. 1. However, this strap 54a and associated ears 376 and 378 form no part of the vertical mounting assembly of the present invention. For example, the receiving ears or other suitable members for completing the universal joint assembly may be formed directly on the headlamp housing, or on a bracket or further connecting member of a different type, without departing from the invention.

In accordance with another feature of the invention, the vertical bracket assembly of FIGS. 6 through 8 includes mounting means 320 and 322 as briefly described hereinabove. In accordance with a preferred form of the invention, these mounting means are integrally formed with the housing and support member 302 and comprise respective pairs of oppositely outwardly extending enlarged mounting portions located generally at upper and lower ends of the housing and support member as shown in FIGS. 6 through 8. These mounting portions will be seen to have relatively enlarged vertical dimensions which define therethrough elongate, generally vertically disposed mounting bores 321, 323. These bores may receive elongate fasteners or the like therethrough for rigidly mounting the housing and support member 302 substantially at four corners thereof to the frame member 22, as illustrated in FIG. 10. Advantageously, these through bores may be threaded to receive the fasteners, or self-threading type fasteners may be utilized, thus obviating the need for any additional fastening or mounting components such as Tinnerman nuts, as utilized for example in the prior art form of FIG. 1.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An adjustment bracket assembly for attachment between ann automotive vehicle frame member or the like and a headlamp housing or the like to permit pivotal motion of the headlamp housing relative to the frame member and about generally vertical and horizontal axes so as to achieve corresponding vertical and horizontal aiming of an associated headlamp beam, said adjustment bracket assembly comprising: a one-piece integrally formed vertically elongate housing and support member defining generally vertically oriented, elongate guide bore means for receiving and supporting an elongate drive shaft member with a free end thereof projecting outwardly of said housing and support member for engagement with drive means for operatively engaging the same with said headlamp housing for selectively causing pivotal movement thereof about one of generally vertical and horizontal axes to achieve one of said vertical and horizontal aiming of the associated headlamp beam; said housing and support member further defining a gear box compartment integrally formed therewith as a part of said one-piece integrally formed member for mounting gear means to be operatively engaged with said drive shaft and also operatively engaged with said headlamp housing to achieve said one of said vertical and horizontal pivotal motion thereof in response to rotation of said drive shaft; and said housing and support member further including integrally formed mounting means, also formed as a part of said one-piece integrally formed member for mounting the same in a secure, non-movable fashion to said automotive vehicle frame member or the like.

2. An assembly according to claim 1 and further including one member of a universal joint arrangement integrally formed with said bracket housing and support member.

3. An assembly according to claim 2 wherein said one member of a universal joint arrangement comprises a ball stud member insert molded with an upper portion of said bracket support and housing member and projecting generally horizontally outwardly thereof for engagement with a mating socket operatively coupled with said headlamp housing or the like.

4. An assembly according to claim 1 wherein said mounting means comprises respective pairs of oppositely outwardly extending enlarged mounting portions located generally at upper and lower ends of said elongate housing and support member and formed integrally therewith, said mounting portions having relatively enlarged vertical dimensions defining therethrough elongate, generally vertically disposed mounting bores for receiving elongate fastener means or the like therethrough for rigidly mounting the housing and support member substantially at four corners thereof to said automotive frame member or the like.

5. An assembly according to claim 1 wherein said shaft receiving and supporting guide bore means comprise a first generally vertically extending bore portion through a lower part of said housing and support member and in communication with said gear box compartment for receiving and directing a gear-driving end portion of said drive shaft member into engagement with gear means mounted in said gear box compartment and a second bore portion coaxially aligned with said first bore portion and located in an upper part of said housing and support member, and guide means intermediate said first and second bore portions for supporting said drive shaft member for free rotation.

6. An assembly according to claim 5 wherein said guide means comprises an elongate, generally semicylindrical groove of complementary form for rotatably receiving said drive shaft member and extending between said upper and lower bore portions.

7. An assembly according to claim 5 wherein said guide means comprises a plurality of vertically spaced, aligned generally C-shaped portions for partially surroundingly engaging said drive shaft member.

8. An adjustment bracket assembly for attachment between an automotive vehicle frame member or the like and a headlamp housing or the like to permit pivotal motion of the headlamp housing relative to the frame member and about generally vertical and horizontal axes so as to achieve corresponding vertical and horizontal aiming of an associated headlamp beam, said adjustment bracket assembly comprising: a one-piece integrally formed vertically elongate housing and support member defining generally vertically oriented, elongate guide bore means for receiving and supporting an elongate drive shaft member with a free end thereof projecting outwardly of said housing and support member for engagement with drive means for operatively engaging the same with said headlamp housing for selectively causing pivotal movement thereof about one of generally vertical and horizontal axes to achieve one of said vertical and horizontal aiming of the associated headlamp beam; said housing and support member further defining a gear box compartment integrally formed therewith for mounting gear means to be operatively engaged with said drive shaft and also operatively engaged with said headlamp housing to achieve said one of said vertical and horizontal pivotal motion thereof in response to rotation of said drive shaft; and said housing and support member further including integrally formed mounting means for mounting the same in a secure, non-movable fashion to said automotive vehicle frame member or the like; and further including one member of a universal joint arrangement integrally formed with said bracket housing and support member; wherein said one member of said universal joint arrangement comprises a first pair of parallel, spaced ears having aligned through apertures defining a first one of generally vertical and generally horizontal axes, and further including an intermediate member comprising a body defining mutually orthogonally oriented through bores, one for alignment with the through apertures of said ears to receive a through pivot pin for pivotal motion of said intermediate member about the axis defined by the aligned through apertures of said ears, and the other of said through bores of said intermediate member being positionable for alignment with a pair of parallel spaced apertured ears operatively coupled with said headlamp housing or the like to receive a second pivot pin therethrough to permit pivotal motion about the other of said generally vertical and generally horizontal axes.

* * * * *